Figure 1:
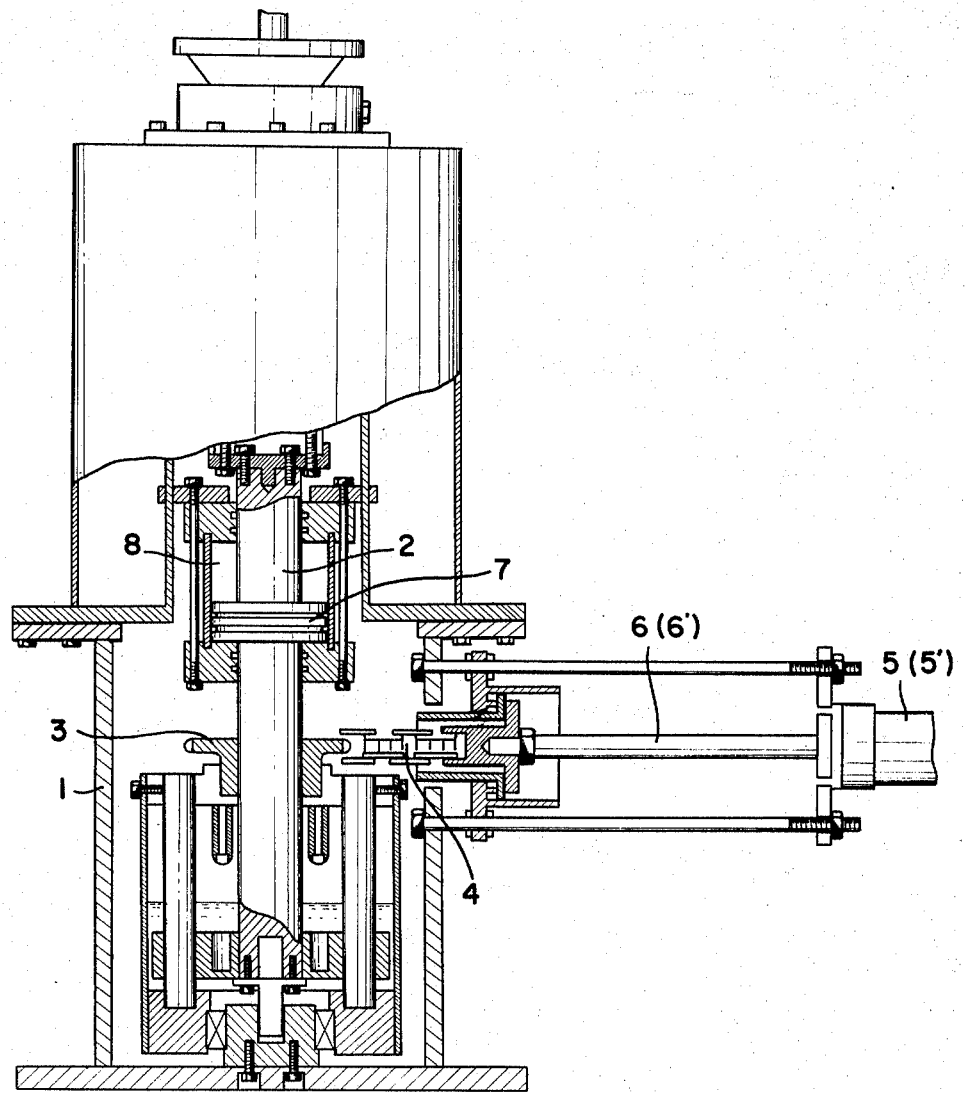

United States Patent [19]
Fujiwara et al.

[11] 3,797,367
[45] Mar. 19, 1974

[54] BUFFER DEVICE OF A ROBOT MACHINE FOR CONTROLLING UPWARD AND DOWNWARD MOVEMENT OF A ROBOT ARM

[75] Inventors: Hisao Fujiwara; Kentaro Sakamoto; Goro Wada, all of Yokohama, Japan

[73] Assignee: Kabushiki Kaisha Keiaisha Seisakusko, Yohohama-Shi, Japan

[22] Filed: May 22, 1973

[21] Appl. No.: 362,878

Related U.S. Application Data
[63] Continuation of Ser. No. 152,575, June 14, 1971, abandoned.

[30] Foreign Application Priority Data
June 30, 1970 Japan.................. 45-56453

[52] U.S. Cl................... 92/2, 92/85, 188/284, 188/288, 188/316
[51] Int. Cl.............................................. F01b 21/00
[58] Field of Search......... 188/284, 316, 288; 92/2, 92/85

[56] References Cited
UNITED STATES PATENTS
1,902,480  3/1933  Woods............................. 92/85 X
2,720,944  10/1955  Girard.............................. 188/288
3,376,957  4/1968  Baumgartner...................... 188/316
3,388,548  6/1968  Vieths.............................. 92/85 X
3,447,644  6/1969  Duckett.......................... 188/288 X Primary Examiner—Edgar W. Geoghegan
Assistant Examiner—Abraham Hershkovitz
Attorney, Agent, or Firm—Larson, Taylor and Hinds

[57] ABSTRACT

This invention relates to a buffer device of a robot machine for controlling upward and downward movement of a robot arm by smoothly and accurately operating the rotational shaft at upper and lower ends of its motion, and which comprises a rotary machine frame rotatably supported on a frame, said frame being rotated integrally with a chain wheel providing rotation to the main shaft, piston rods in the rotary frame being inserted in to blind holes provided on a flat disk rising with the main shaft, a piston rod at lower end of the main shaft being inserted into a blind hole at the bottom of the machine frame, and a flat disk being dipped in the oil.

2 Claims, 2 Drawing Figures

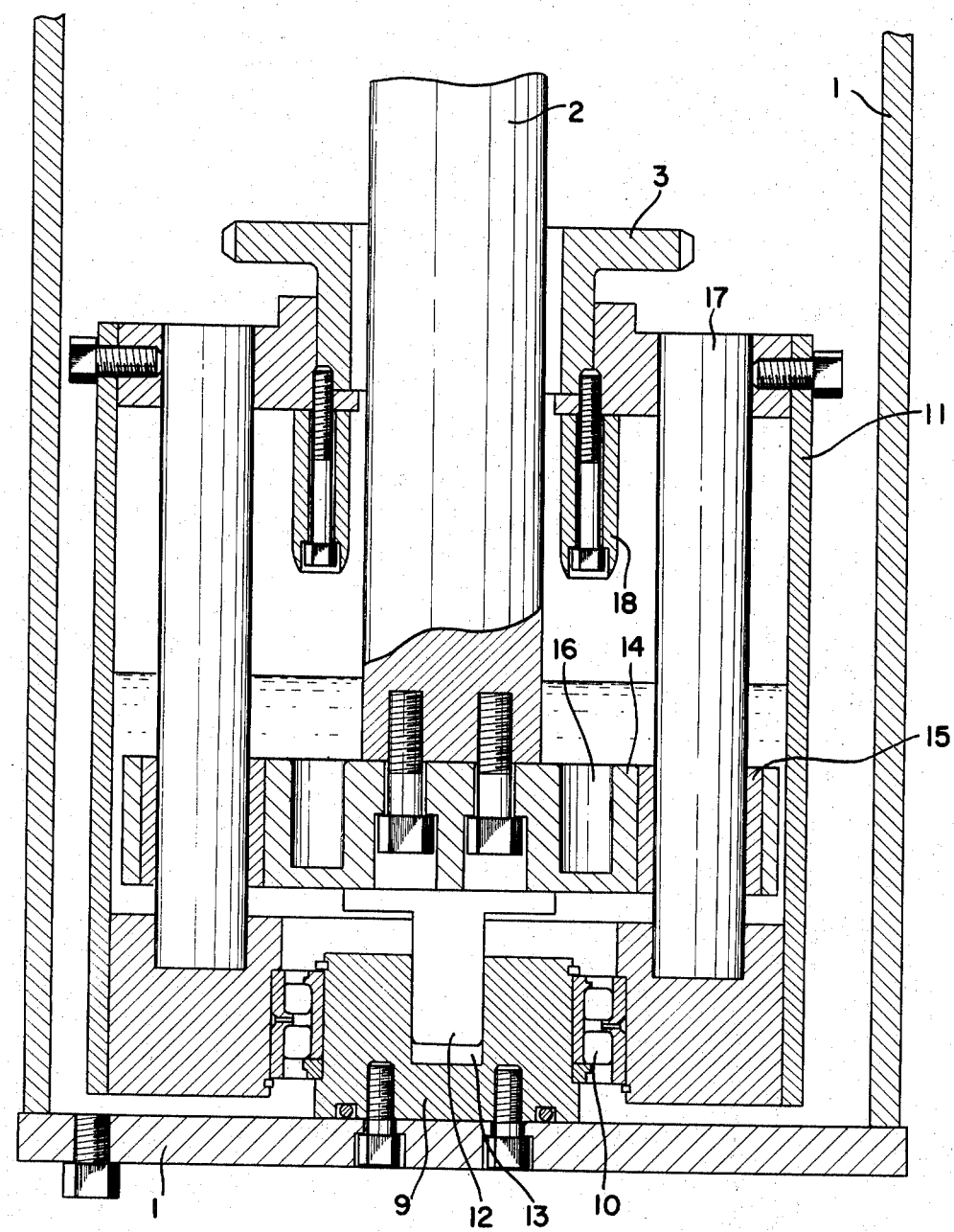

3,797,367

BUFFER DEVICE OF A ROBOT MACHINE FOR CONTROLLING UPWARD AND DOWNWARD MOVEMENT OF A ROBOT ARM

This is a continuation, of application Ser. No. 152,575 filed June 14, 1971, now abandoned.

This invention relates to a robot machine for industries and, more particularly to a buffer device for a robot machine for controlling upward and downward movement of a robot arm.

Known industrial robots have been generally employed for the transfer of a manufactured article or work piece from one place to the other during operation such as in the press mill and other places.

The industrial robot of the kind as above described usually comprises a holder means fixed at an end of an arm swingable on a pivot of a rotary shaft, and in use, the swing movement of the arm, upward and downward movement of the shaft, and opening or closing operation of the holder means are attained by means of hydraulic pressure device or electric motor, whereby the operation of the robot can be repeated in the order and amount of motion according to the program as predetermined.

In the beginning or at the end of a certain movement, however, the robot machine often exhibits awkwardness with respect to the operation of the holder arm due to inertia and by weight of an article which the arm withholds and carries. In particular, the drawback is recognized when the arm of the robot is not capable of stopping at a correct position as predetermined.

The present invention is intended to remove the above described drawback and has for its object to provide a suitable buffer means for smoothly and accurately operating the rotary shaft at upper and lower ends of its motion.

In accordance with the invention, the buffer means comprises a piston attached to a main shaft providing upper and lower movement to the main shaft said piston being accommodated in an operating cylinder which moves upwardly and downwardly by hydraulic pressure, a piston rod being provided at the lower end of the main shaft and inserted into the cylinder on a framework of the robot machine so as to buffer the downward movement of the main shaft, a flat disk having guide holes and blind holes extending from upper surface, guide rods passing through said guide holes and piston rods inserted into said blind holes on the disk, a chain wheel permitted to move the main shaft upwardly and downwardly but not to revolve it, said piston rods being inserted into said blind holes when said disk rises and producing a buffering operation by means of hydraulic pressure.

In the buffer device according to the invention, the hydraulic pressure is applied either to the upper or lower surfaces of the piston in the cylinder whereby the main shaft can be moved upwardly and downwardly through the boss of the chain wheel of the rotary driving source without regard to the rotation of the main shaft. The piston rod at the lower end of the main shaft can thus be limit and stop by buffering the downward movement of the main shaft at the lowest. The piston rods integrated with the chain wheel together with the blind holes of the flat disk stop the rising movement of the main shaft at the highest limit by buffering. Efficient buffer stopping of both upward and downward movements can be therefore effected for the main shaft.

The invention will now be illustrated by way of example on an embodiment with reference to the drawings, in which:

FIG. 1 is a cross section of an essential portion of an industrial robot machine provided with a buffer device according to the invention; and FIG. 2 is a view illustrating the buffer device.

Referring now to the drawings, a machine frame 1 is shown having a main shaft 2 which is rotatable and slidable upwardly and downwardly. The rotation of the main shaft 2 is effected by the main chain wheel 3 capable of moving by means of a key so that the main shaft can slide upwardly and downwardly but cannot relatively rotate. The both ends of the chain 4 winding about the chain wheel 3 are respectively secured to rods 6 and 6' of the pistons movable in the hydraulic pressure means 5 and 5'. Then the chain is pulled around by one of the hydraulic pressure means, the main shaft can rotate without regard to its position either in the upward or downward direction.

The main shaft 2 thus can move upwardly or downwardly without relation to the position of rotation provided that the hydraulic pressure is applied to either of the chambers of the cylinder 8 surrounding the piston part 7 which is integral with the main shaft 2.

Though not shown, the robot arm is provided transversely at the top end of the main shaft. The robot arm has a holding means provided at the forward end thereof. The operation device for the holding means is provided inside the robot arm.

Now, referring to FIG. 2, the buffer device in association with the upward and downward movement of the main shaft 2 is shown in a plan view.

In FIG. 2, a circular table 9 is secured to the bottom of the machine frame 1, to which a rotary frame 11 which is rotatable with the chain wheel 3 is provided through the roller bearings 10.

The piston rod 12 attached to the lower end of the main shaft 2 is inserted into the blind hole 13 provided on the circular table 9 so as to damp and stop the downward movement of the main shaft 2 by oil therein.

There is provided a disk 14 near the lower end of the main shaft 2. The disk 14 has a preferred number of through holes 15, and a blind holes 16 on the upper surface, to which guide rods 17 depending from the upper surface of the rotary frame 11 and piston rods 18 are respectively inserted. When the disk 14 comes downwards, it is dipped in the oil stored in the machine frame 1.

With the construction as hereinbefore described, the main shaft 2, chain wheel 3, and rotary machine frame 11 together rotate about the circular table 9, when the chain wheel 3 rotates by chain 4 without regard to the position of the main shaft 2 either upwardly or downwardly. The main shaft 2 can therefore make upward and downward movement at a preferred rotary position by action of the piston 7 and cylinder 8. At the instant, the flat disk 14 moves upwardly and downwardly with the main shaft 2.

Upon downward movement of the main shaft 2, the piston rod 12 is inserted into the blind hole 13. Since oil is filled in the blind hole 13, the buffer stop is effected for the main shaft.

When the main shaft 2 rises, the flat disk 14 with oil filled in the blind holes 16 is moved by the guide rod 17 and rises. The piston rods 18 are inserted into the blind holes 16 so as to effect the buffer stop smoothly and accurately for the main shaft 2 in rising.

The invention thus can exactly and reliably buffer the upward and downward movement of the robot with a very simple construction and obtain a very excellent industrial robot.

What we claim is:

1. A buffer device for buffering upward and downward movement of a shaft of an industrial robot comprising:

means for mounting said shaft for vertical movement along its axis and power means for raising and lowering the shaft, a rotating frame operatively engaged with the shaft to rotate therewith while permitting the shaft to move axially relative to the frame, and means for rotating the frame and the shaft together regardless of the axial position of the shaft relative to the frame, said rotating frame including upper and lower horizontally extending generally disc shaped members interconnected by a casing and defining therewith an enclosed chamber surrounding the lower end of the shaft and filled up to a given level with a liquid, guide rods extending vertically through the enclosed chamber and fixed to the two said disc shaped members, said shaft extending through the upper of said generally disc shaped members and including a disc shaped flange member rigid with the main part of the shaft and located within the enclosed chamber below the level of the liquid when the shaft is at its lowermost point of travel and located vertically between said generally disc shaped members of the rotary frame, said guide rods extending through openings in the disc shaped flange member to establish a rotary driving connection between the shaft and the rotary frame, first recesses formed into the top of the flange member such that the first recesses fill with liquid when the shaft moves to its lowermost points, first projections fixed to the bottom of the upper disc shaped member and extending downwardly and vertically aligned with and matable with said first recesses, whereby when the shaft with said first recesses filled with liquid rises upwardly, the upward movement is buffered by engagement of the first projections with the liquid in the first recesses as the first projections attempt to enter the first recesses, and an upwardly opened second recess in the top of the lower disc shaped member below the level of the liquid such that said second recess is continuously filled with liquid, a second projection projecting downwardly from the bottom of the flange and vertically aligned and matable with said second recess, whereby, when the shaft moves downwardly to its lowermost point, its downward movement is buffered by engagment of the second projection with the second recess as the second projection attempts to enter the second recess.

2. A buffer device according to claim 1, said power means being a double acting piston and cylinder unit operatively engaged with the said shaft.

* * * * *